United States Patent Office 2,914,540
Patented Nov. 24, 1959

2,914,540

STABILIZATION OF MONOMERIC 3,3-BIS(CHLORO-METHYL)-OXETANE

Robert F. Goddu, Kennett Square, Pa., and James A. Hudy, Wilmington, Del., assignors to Hercules Powder Company, Wilmington, Del., a corporation of Delaware No Drawing. Application July 5, 1957
Serial No. 669,951

6 Claims. (Cl. 260—333)

This invention relates to a new composition of matter and, more particularly, to monomeric 3,3-bis(chloromethyl)oxetane stabilized with a phenolic type antioxidant.

Heretofore, in the preparation of polymers of 3,3-bis(chloromethyl)oxetane, it has been found that the monomeric materials utilized are sometimes lacking in quality which deleteriously effects the polymerization reaction. It has been found that this lack of quality to a considerable extent is due to autoxidation of the monomers. It has further been found that under prolonged periods of storage this oxidative deterioration increases with generation of impurities which lower the quality of the monomer and reduces its attractiveness and in some instances makes it useless for polymer production and other uses.

Now, in accordance with this invention, there is provided as a new composition of matter, monomeric 3,3-bis(chloromethyl)oxetane stabilized with a phenolic type antioxidant whereby the composition may be stored or shipped satisfactorily for long periods of time without harmful effect to its polymerizability and other utility where autoxidation is harmful. More specifically, this invention provides as a new composition of matter, monomeric 3,3-bis(chloromethyl)oxetane stabilized with at least one material of the group consisting of 2,2'-methylene-bis(4-methyl-6-tertiary-butyl phenol), 2,2'-methylene-bis(4-ethyl-6-tertiary-butyl phenol), hydroquinone, di-tertiary-butyl hydroquinone, and resorcinol monobenzoate.

The following Examples 1–5 serve to show the improvement of the compositions of this invention over monomeric 3,3-bis(chloromethyl)oxetane wherein the extent of oxidative degradation is expressed in terms of the peroxidic oxygen content of the material tested. In the examples the material tested was monomeric 3,3-bis-(chloromethyl)oxetane and the antioxidant used where indicated was 2,2'-methylene-bis(4-methyl-6-tertiary-butyl phenol).

*Examples 1–5*

| Example | Antioxidant By Weight Percent | Days of Exposure | Peroxidic Oxygen (p.p.m.) | |
|---|---|---|---|---|
| | | | Initial | Final |
| 1 | 0 | 6 | 10.7 | 52.7 |
| 2 | 0 | 15 | 18.3 | 27.9 |
| 3 | 0 | 3 | 13.8 | 29.1 |
| 4 | 0.5 | 3 | 13.8 | 13.4 |
| 5 | 0.5 | 40 | 5.4 | 1.5 |

With reference to the foregoing examples, it will be noted that the peroxidic oxygen content of Examples 1, 2 and 3 without antioxidant increased appreciably during the designated exposure periods. In contrast thereto, the peroxidic oxygen content of Examples 4 and 5 with antioxidant, representing the compositions of this invention, did not increase at all during the exposure periods and under the prolonged exposure period of Example 5, the peroxidic oxygen content was actually considerably reduced.

The following Examples 6–13 further serve to show the improvement afforded by the compositions of this invention. In this respect, it will be appreciated that oxidative degradation of monomeric 3,3-bis(chloromethyl) oxetane is most noted by its effect on polymerizability of the material. In these examples the effect of the various phenolic compounds disclosed herein on the specific viscosity of polymers obtained from 3,3-bis(chloromethyl)oxetane monomers stored for various lengths of time is given. All polymerizations were run in rubber capped polymerization tubes at —25° C. The reaction mixture in each case contained 2 volumes of liquid sulfur dioxide to 1 volume of 3,3-bis(chloromethyl)oxetane and boron trifluoride as catalyst at a level of 1.5% by weight of the monomer with the reaction or polymerization time being 2 hours.

*Examples 6–13*

| Example | Antioxidant | Concentration By Weight Percent | Spec. Viscosity of Polymer (1% in Cyclohexanone) [1] | | |
|---|---|---|---|---|---|
| | | | Original | After 1 week | After 2 weeks |
| 6 | None | 0 | 2.36 | 1.84 | [2] |
| 7 | do | 0 | 1.59 | [2] | [2] |
| 8 | 2,2'-Methylene-bis(4-methyl-6-tertiary-butyl phenol). | 0.5 | 1.61 | 1.62 | 1.67 |
| 9 | 2,2'-Methylene-bis(4-ethyl-6-tertiary-butyl phenol). | 0.5 | 1.99 | 2.07 | 2.05 |
| 10 | Hydroquinone | 0.5 | 2.36 | 2.55 | 2.52 |
| 11 | Di-tertiary-butyl hydroquinone | 0.5 | 2.36 | 2.15 | 1.87 |
| 12 | Resorcinol Monobenzoate | 0.5 | 2.36 | 1.93 | 1.68 |
| 13 | 2,2'-Methylene-bis(4-methyl-6-tertiary-butyl phenol). | 0.02 | 2.0 | 1.9 | 1.6 |

[1] Specific viscosity of polymer measured as a 1% solution in cyclohexanone at 50° C.
[2] Failed to polymerize.

With reference to the foregoing examples, it will be noted that the specific viscosity of Examples 6 and 7 without antioxidant decreased appreciably and under the exposure test of 2 weeks failed to polymerize. In contrast thereto, the specific viscosity of Examples 8 to 13, inclusive, with antioxidant remained at a substantially high level and under the exposure test of 2 weeks gave successful polymerization in each case.

The following Examples 14 and 15 serve to show that the compositions of this invention may be satisfactorily polymerized using other types of polymerization tech-

Example 14

To 130 g. of 3,3-bis(chloromethyl)oxetane, which contained 0.5% by weight of 2,2'-methylene-bis(4-methyl-6-tertiary-butyl phenol) contained in a glass flask fitted with a reflux condenser and under a nitrogen blanket, was added 15 mg. of aluminum chloride. The mixture was heated rapidly to about 150° C. at which point exothermic polymerization started. The polymerizing mass was poured into methanol and the polymerization stopped. The isolated polymer was washed with methanol and dried. The specific viscosity of a 1% solution of the polymer in cyclohexanone was 1.29.

Example 15

A 10-ml. portion of 3,3-bis(chloromethyl)oxetane containing 0.4% by weight of 2,2'-methylene-bis(4-methyl-6-tertiary-butyl phenyl) was placed in a capped 4-inch crown-topped tube and heated to 100° C. To the heated mixture was added 0.5 cc. of a 0.32 M solution of triethyl aluminum in n-heptane. An exothermic polymerization resulted. The isolated polymer was extracted with methanol and dried. A 1% solution of the polymer in cyclohexanone at 50° C. gave a specific viscosity of 0.71.

From the foregoing examples, it will be appreciated that the stabilizers or antioxidants of utility in preparing the compositions of this invention are 2,2'-methylene-bis(4-methyl-6-tertiary-butyl phenol); 2,2'-methylene-bis(4-ethyl-6-tertiary-butyl phenol); hydroquinone; di-tertiary-butyl hydroquinone; and resorcinol monobenzoate. These materials may be incorporated singly or as mixtures thereof, if desired, by simple admixture with the monomer in an amount of from about 0.02 to about 5% and preferably from about 0.3 to about 1.0% by weight of the monomer. Furthermore, as the examples demonstrate, the compositions of this invention may be utilized for the direct preparation of polymers of 3,3-bis(chloromethyl)oxetane without any detrimental effect on polymerizability and with the additional advantage of having the stabilizer present in the finished polymer. Moreover, other monomers may be copolymerized with the compositions of this invention such as 3,3-bis(fluoromethyl)oxetane, 3,3-bis(bromomethyl)oxetane, 3-chloromethyl-3-methyloxetane, 3,3-dimethyloxetane, 3,3-bis(phenoxymethyl)oxetane, etc., and other copolymerizable monomers such as oxetane, and other substituted oxetanes. Thus, although it will be appreciated that the primary utility of the compositions of this invention resides in the preparation of polymers of 3,3-bis(chloromethyl)oxetane, it furthermore will be appreciated that the compositions of this invention are susceptible to other utility, such as, in combination with other substances to give various copolymers and in combination with other substances to give various reaction products.

The monomers suitable for the prepartion of the compositions of this invention may be prepared as disclosed in United States Patent No. 2,794,027 and polymerization of the compositions may be carried out as disclosed in United States Patent No. 2,722,520 or United States application Serial Nos. 606,217; 606,228 and 606,229.

From the foregoing, it will be appreciated that the advantages of this invention are multifold. The invention provides for the supply of monomeric 3,3-bis(chloromethyl)oxetane as a material of commerce as a stable composition for multiple uses which heretofore required fresh or reconditioned product. Furthermore, the stabilized compositions of this invention tend to carry their enhanced stability properties into end products utilizing the compositions of this invention in their reaction media. Still further, the stabilized compositions of this invention are ideally suited for the preparation of homogeneously colored polymers therefrom, and particularly when using a high temperature polymerization system such as that demonstrated by Examples 14 and 15. For such preparation, the coloring material may be either a dye or a pigment, inorganic or organic, which is added to the stabilized composition in an amount of from about 1 p.p.m. and 5% by weight. Catalyst may be added with the coloring material or thereafter depending upon when it is desired to prepare the polymer. Some of the advantages of this procedure are: economical operation by elimination of a separate coloring step, thus allowing direct extrusion of colored molding powder or monofilament; more homogeneous distribution of the color throughout the polymer; preparation of colored objects by polymerization in the mold, as for example, in potting compounds; and unlimited opportunities for preparing intermediate colors by mixing different stock batches of colored and stabilized monomer. The above advantages are significant over the costly process of blending coloring matter into a molten finished polymer. Other advantages of applying the principle of the invention will be apparent without departing from the spirit and scope of the appended claims.

What we claim and desire to protect by Letters Patent is:

1. As a new composition of matter, monomeric 3,3-bis(chloromethyl)oxetane stabilized against detrimental effect on polymerizability with a material selected from the group consisting of 2,2'-methylene-bis(4-methyl-6-tertiary-butyl phenol), 2,2'-methylene-bis(4-ethyl-6-tertiary-butyl phenol), hydroquinone, di-tertiary-butyl hydroquinone, and resorcinol monobenzoate, the stabilizer being present in an amount of from about 0.02 to about 5% by weight of the monomer.

2. As a new composition of matter, monomeric 3,3-bis(chloromethyl)oxetane stabilized against detrimental effect on polymerizability with 2,2'-methylene-bis(4-methyl-6-tertiary-butyl phenol), the stabilizer being present in an amount of from about 0.02 to about 5% by weight of the monomer.

3. As a new composition of matter, monomeric 3,3-bis(chloromethyl)oxetane stabilized against detrimental effect on polymerizability with 2,2'-methylene-bis(4-ethyl-6-tertiary-butyl phenol), the stabilizer being present in an amount of from about 0.02 to about 5% by weight of the monomer.

4. As a new composition of matter, monomeric 3,3-bis(chloromethyl)oxetane stabilized against detrimental effect on polymerizability with hydroquinone, the stabilizer being present in an amount of from about 0.02 to about 5% by weight of the monomer.

5. As a new composition of matter, monomeric 3,3-bis(chloromethyl)oxetane stabilized against detrimental effect on polymerizability with di-tertiary-butyl hydroquinone, the stabilizer being present in an amount of from about 0.02 to about 5% by weight of the monomer.

6. As a new composition of matter, monomeric 3,3-bis(chloromethyl)oxetane stabilized against deterimental effect on polymerizability with resorcinol monobenzoate, the stabilizer being present in an amount of from about 0.02 to about 5% by weight of the monomer.

References Cited in the file of this patent

UNITED STATES PATENTS

| | | |
|---|---|---|
| 2,525,410 | Hinegardner | Oct. 10, 1950 |
| 2,617,810 | Taylor | Nov. 11, 1952 |
| 2,722,340 | Feild | Nov. 1, 1955 |
| 2,734,032 | Coppock | Feb. 7, 1956 |